United States Patent [19]

Shimaoka et al.

[11] Patent Number: 4,667,541
[45] Date of Patent: May 26, 1987

[54] FAIL-SAFE GEAR-SHIFTING CONTROL SYSTEM FOR AN AUTOMATIC TRANSMISSION

[75] Inventors: Shinji Shimaoka; Koichi Yamamoto, both of Hiroshima, Japan

[73] Assignee: Mazda Motor Corporation, Japan

[21] Appl. No.: 854,906

[22] Filed: Apr. 23, 1986

[30] Foreign Application Priority Data

Apr. 26, 1985 [JP] Japan ................................. 60-88890

[51] Int. Cl.⁴ ............................................ B60K 41/06
[52] U.S. Cl. .................................. 74/866; 364/424.1
[58] Field of Search ................ 74/862, 863, 864, 865, 74/866; 364/424.1

[56] References Cited

U.S. PATENT DOCUMENTS

| | | | |
|---|---|---|---|
| 4,523,281 | 6/1985 | Noda et al. ........................ | 364/424.1 |
| 4,561,055 | 12/1985 | McKee ............................. | 74/866 X |
| 4,584,906 | 4/1986 | Nagaoka et al. ..................... | 74/866 |

FOREIGN PATENT DOCUMENTS

| | | | |
|---|---|---|---|
| 57-65454 | 4/1982 | Japan . | |
| 57-116957 | 5/1982 | Japan . | |
| 2034422 | 6/1980 | United Kingdom .................. | 74/866 |
| 2084673 | 4/1982 | United Kingdom .................. | 74/864 |

*Primary Examiner*—Allan D. Herrmann
*Assistant Examiner*—Martin G. Belisario
*Attorney, Agent, or Firm*—Gerald J. Ferguson, Jr.; Michael P. Hoffman; Ronni S. Malamud

[57] ABSTRACT

In a gear-shifting control system for an automatic transmission, gear-shifting is normally controlled according to main gear-shifting characteristics in which gear-shifting points are determined using the turbine rpm as a parameter. On the other hand, gear-shifting is effected according to backup gear-shifting characteristics which are determined using the vehicle speed as a parameter in case of failure of the part for detecting the turbine rpm.

11 Claims, 9 Drawing Figures

FAIL-SAFE GEAR-SHIFTING CONTROL SYSTEM FOR AN AUTOMATIC TRANSMISSION

BACKGROUND OF THE INVENTION

1. Field of the Invention

This invention relates to a gear-shifting control system for an automatic transmission, and more particularly to a gear-shifting control system for an automatic transmission in which gear-shifting is controlled according to a backup gear-shifting characteristics for emergency use in case of failure of a sensor for detecting the output shaft rpm of the torque converter.

2. Description of the Prior Art

There has been in wide use an automatic transmission having a torque converter in combination with a multiple stage transmission gear mechanism such as a planetary gear-train. Generally, such an automatic transmission is controlled by way of a hydraulic mechanism in which fluid actuators such as brakes and clutches incorporated in the multiple stage transmission gear mechanism are controlled to change the transmission systems of the engine output power to obtain a desired transmission speed by the switching of hydraulic circuits using electromagnetic type switching valves. The running condition of a vehicle is detected by an electronic control device and the hydraulic circuits are switched to effect gear-shifting when the running condition of the engine crosses a predetermined gear-shifting line. Generally the hydraulic circuits are switched by selectively operating the electromagnetic type switching valves according to an upshifting signal or a downshifting signal from the electronic control device.

In controlling the automatic transmission, the torque converter output shaft rpm, i.e., the turbine rpm, functions as a parameter for determining the gear-shifting characteristics and is a very important factor. There has been known an automatic transmission in which lockup is released when the part for detecting the turbine rpm fails (see Japanese Unexamined Patent Publication No. 57(1982)65454). However, if failure of the part for detecting the turbine rpm is dealt with by simply releasing lockup, there is a risk that gear-shifting will not be effected or that the automatic transmission will shift to the wrong gear, e.g., the transmission with downshift to a very low speed gear during a high speed travel, rendering further travel impossible.

SUMMARY OF THE INVENTION

In view of the foregoing observations and description, a primary object of the present invention is to provide a gear-shifting control system for an automatic transmission in which the turbine rpm is employed as a parameter for determining the gear-shifting characteristics and gear-shifting is securely effected even if the part for detecting the turbine rpm fails.

In accordance with the present invention, in case that the part for detecting the turbine rpm fails, gear-shifting is effected according to backup gear-shifting characteristics which are determined using the vehicle speed as a parameter.

That is, normally, gear-shifting is controlled according to main gear-shifting characteristics in which gear-shifting points are determined using the turbine rpm as the parameter, while gear-shifting is controlled according to the backup gear-shifting in which the gear-shifting points are determined using the vehicle speed as the parameter.

It is preferred that the backup gear-shifting characteristics be determined so that the gear-shifting is effected in accordance with the backup gear-shifting characteristics at vehicle speeds not lower than the vehicle speeds at which gear-shifting is effected in accordance with the main gear-shifting characteristics.

Thus the higher of the gear speeds determined with reference to the main gear-shifting characteristics and the backup gear-shifting characteristics is adopted as the gear speed into which the automatic transmission is to be actually shifted. With this arrangement, since the output of the part for detecting the turbine rpm generally becomes zero when the part fails, gear-shifting is positively effected in accordance with the main gear-shifting characteristics when the part which detects the turbine rpm is normal and the gear-shifting characteristics can be automatically changed to the backup gear-shifting characteristics when the part for detecting the turbine rpm fails, thereby rendering unnecessary the provision of means for separately detecting failure of the part for detecting the turbine rpm and enabling the control system to be simplified.

Figure 1:
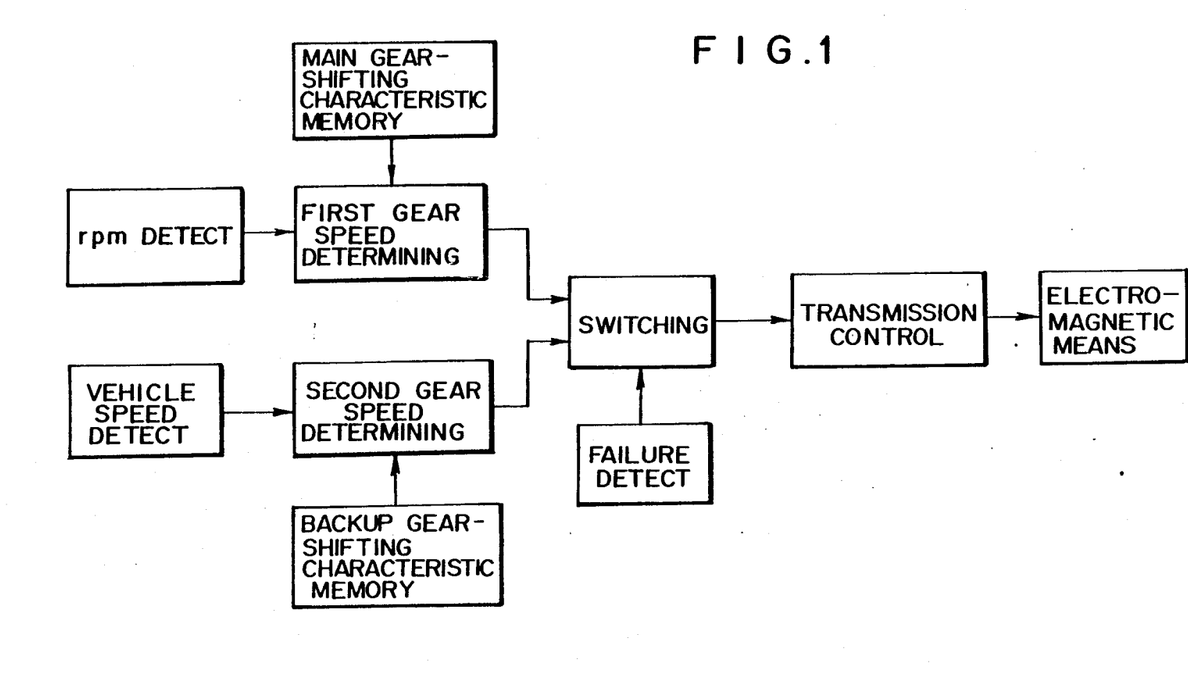
FIG. 1 is an outline schematic illustrating the gear-shifting control system of the present invention.

More specifically, the gear-shifting control system in accordance with the present invention comprises, as shown in FIG. 1, an rpm detecting means for detecting the rpm of the output shaft or the input shaft of the torque converter; an engine load detecting means for detecting engine load; a vehicle speed detecting means for detecting the vehicle speed; a main gear-shifting characteristic memory in which main gear-shifting characteristics are stored, gear-shifting points being determined with at least the engine load and the rpm of the output shaft or the input shaft of the torque converter employed as parameters in the main gear-shifting characteristics; a first gear speed determining means which receives at least the outputs of the rpm detecting means and the engine load detecting means and determines a main gear speed to be selected in accordance with the main gear-shifting characteristics; a backup gear-shifting characteristic memory in which backup gear-shifting characteristics are stored, gear-shifting points being determined with at least the vehicle speed employed as a parameter in the backup gear-shifting characteristics; a second gear speed determining means which receives at least the output of the vehicle speed detecting means and determines a backup gear speed to be selected in accordance with the backup gear-shifting characteristics; a failure detecting means for detecting failure of the rpm detecting means; a gear speed signal switching means which receives the signals from the failure detecting means and the first and second gear speed determining means and outputs the signal from the second gear speed determining means when the rpm detecting means fails; and a transmission control means which controls the electromagnetic means according to the output of the gear speed signal switching means.

DESCRIPTION OF THE PREFERRED EMBODIMENT

An example of an automatic transmission to which the present invention is applicable is first described with reference to FIG. 2.

Figures 2, 2A:
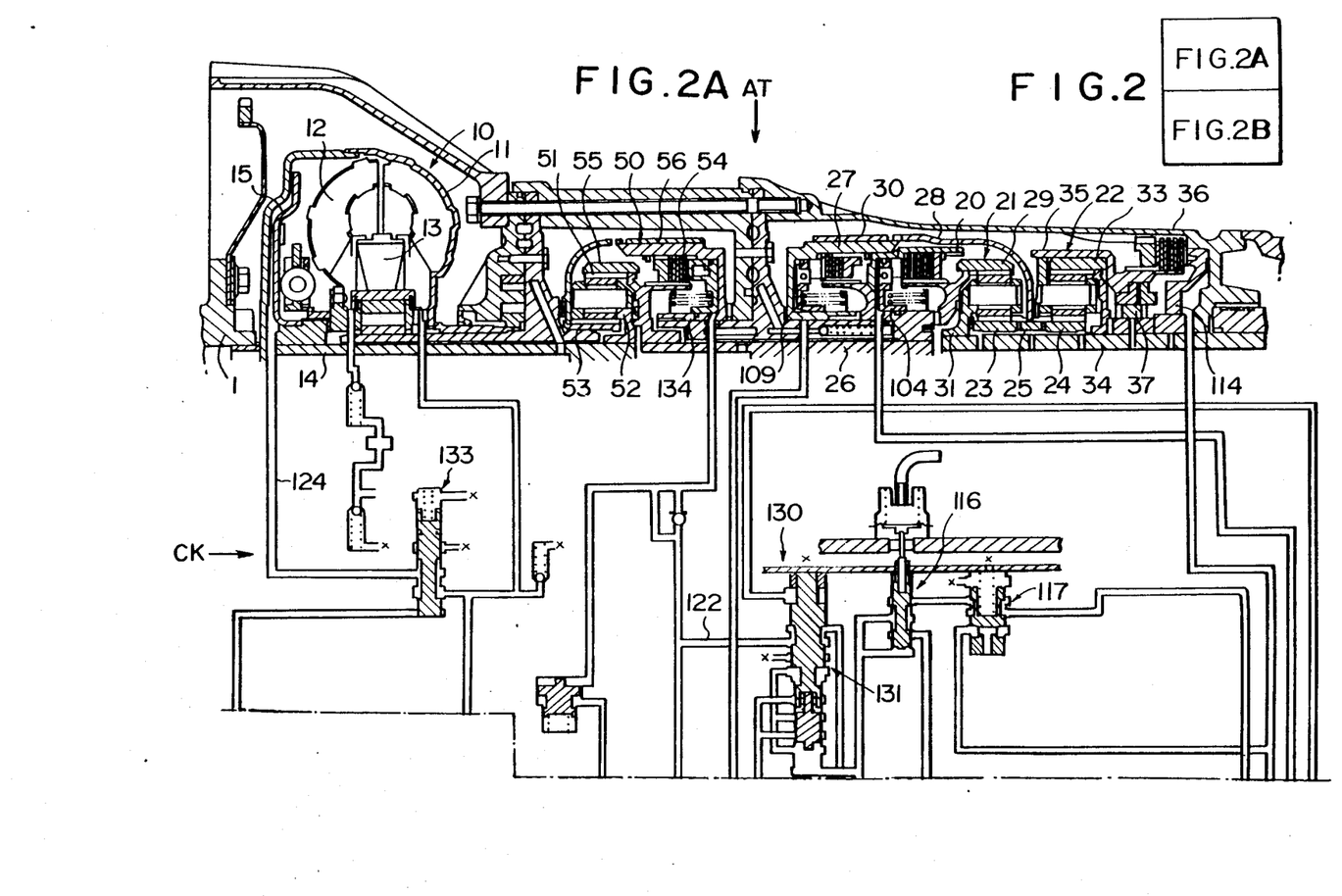
FIG. 2 shows the relationship of FIGS. 2A and 2B.
FIG. 2A and 2B show an example of an automatic transmission to which the present invention is applicable, FIG. 3 a schematic view showing an engine provided with the automatic transmission of FIG. 2 the hydraulic control circuit of which is controlled by an automatic transmission control system in accordance with an embodiment of the present invention.
Figure 2B:
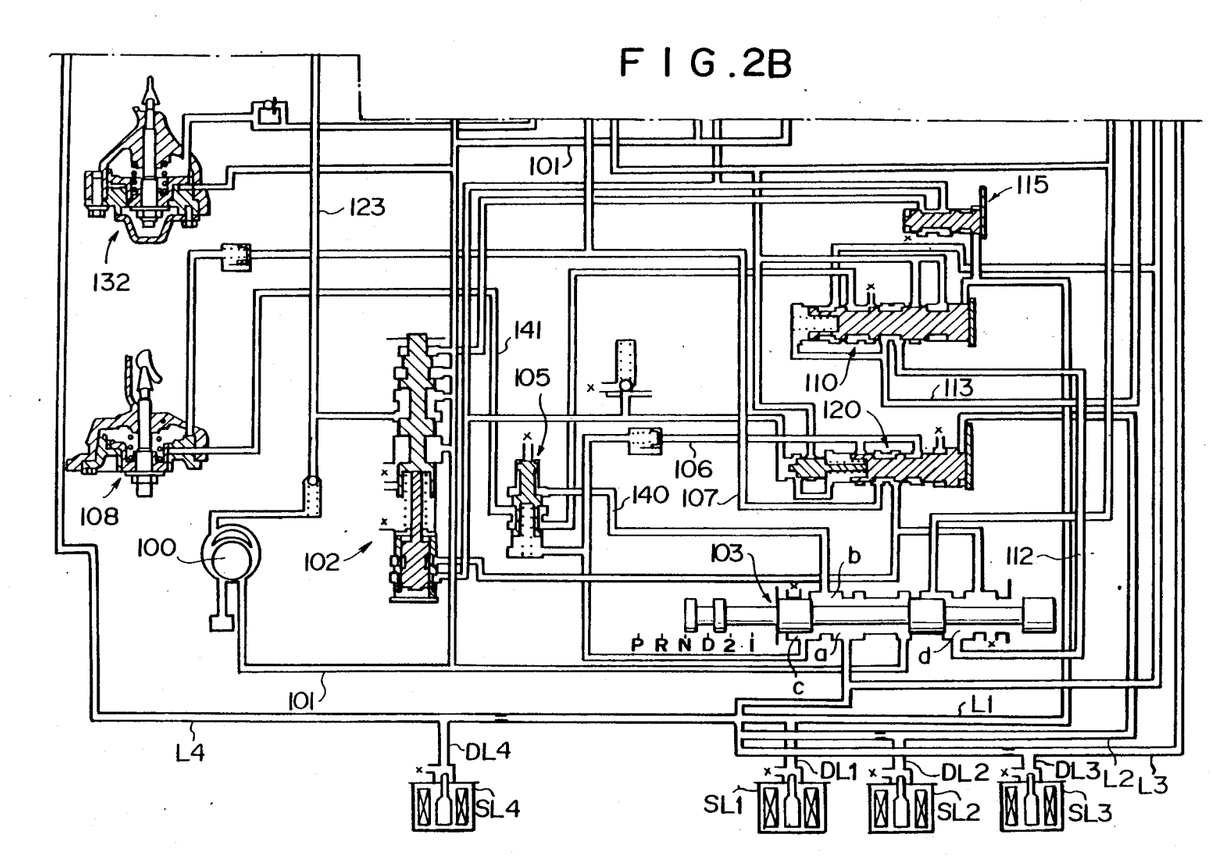

In FIG. 2, the automatic transmission AT comprises a hydraulic torque converter 10, a multiple stage transmission gear mechanism 20, and a planetary gear type over-drive transmission mechanism 50 arranged between the torque converter 10 and the multiple stage transmission gear mechanism 20.

The torque converter 10 has a pump 11 connected to an engine output shaft 1, a turbine 12 provided facing to the pump 11 and a stator 13 disposed between the pump 11 and the turbine 12. A converter output shaft 14 is connected to the turbine 12. A lock-up clutch 15 is provided between the converter output shaft 14 and the pump 11. The lock-up clutch 15 is normally urged into engagement to lock up the engine output shaft 1 to the converter output shaft 14 under the pressure of hydraulic fluid which circulates in the torque converter 10, and is released by a releasing hydraulic pressure which is supplied from an external pressure source.

The multiple stage transmission gear mechanism 20 has a front planetary gear unit 21 and a rear planetary gear unit 22. The front planetary gear unit 21 has a sun gear 23 connected with a sun gear 24 of the rear planetary gear unit 22 by way of a connecting rod 25. The gear mechanism 20 has an input shaft 26 connected through a front clutch 27 with the connecting rod 25 and through a rear clutch 28 with an internal gear 29 of the front planetary gear unit 21. A front brake 30 is provided between the connecting rod 25 or the sun gears 23 and 24 of the gear units 21 and 22, and a casing of the transmission. The gear mechanism 20 also has an output shaft 34 connected with a planetary carrier 31 of the front planetary gear unit 21 and an internal gear 33 of the rear planetary gear unit 22. The rear planetary gear unit 22 has a planetary carrier 35, and there are provided between the planetary carrier 35 and the transmission casing a rear brake 36 and a one-way clutch 37.

The planetary gear type over-drive transmission mechanism 50 includes planetary gears 51, a planetary carrier 52 rotatably carrying the planetary gears 51 and connected with the output shaft 14 of the torque converter 10, and a sun gear 53 engaged with an internal gear 55 by way of a direct connection clutch 54. An over-drive brake 56 is provided between the sun gear 53 and the transmission casing. The internal gear 55 is connected with the input shaft 26 of the multiple stage transmission gear mechanism 20.

The multiple stage transmission gear mechanism 20 is of a known type and can provide three forward speeds and one reverse. The planetary gear type over-drive transmission mechanism 50 connects the shafts 14 and 26 directly when the direct connection clutch 54 engages and the brake 56 is released, and provides an over-drive connection between the shafts 14 and 26 when the brake 56 is engaged and the clutch 54 is released.

As shown in FIG. 2, the automatic transmission AT is provided with a hydraulic control circuit CK. The hydraulic control circuit has an oil pump 100 which is driven by the engine output shaft 1. Hydraulic oil is discharged under pressure from the pump 100 into a pressure line 101. The oil pressure is reduced by a pressure regulating valve 102 and applied to a select valve 103. The select valve 103 has a plunger which can be selectively positioned in one of shift positions 1, 2, D, N, R and P. When the select valve 103 is positioned in the position 1, 2 or D, the pressure line 101 is communicated with the ports a, b and c of the select valve 103. The port a is communicated with a hydraulic actuator 104 for the rear clutch 28. When the select valve 103 is positioned in any one of the positions D, 2 and 1, the actuator 104 causes the rear clutch 28 to engage.

The port a is also communicated with a portion of a 1-2 shift valve 110 near the left hand end thereof to urge the spool rightward in FIG. 2. The port a is further communicated with the right hand end of the 1-2 shift valve 110 through a first line L1, with the right hand end of a 2-3 shift valve 120 through a second line L2 and with a right hand end of a 3-4 shift valve 130 by way of a third line L3.

From the first to third lines L1 to L3 respectively branch off first to third drain lines DL1 to DL3. The first to third drain lines DL1 to DL3 are respectively opened and closed by solenoid valves SL1 to SL3. When the solenoid valves SL1 to SL3 are de-energized while the pressure line 101 and the port a are in communication with each other, the drain lines DL1 to DL3 are closed and the pressures in the first to third lines are increased.

The port b is also communicated with a second lock valve 105 by way of a line 140 and the pressure at the port b urges downward the spool of the second lock valve 105 as seen in FIG. 2. When the spool of the second lock valve 105 is in the lower position, the line 140 is communicated with a line 141 and a hydraulic pressure is applied to the engaging side pressure chamber of an actuator 108 of the front brake 30 to hold the front brake 30 in the operative position. The port c is connected to the second lock valve 105 and the pressure at the port c urges downward the spool of the second lock valve 105. Further, the port c is connected to the 2-3 shift valve 120 through a pressure line 106. The pressure line 106 is communicated with a line 107 when the solenoid valve SL2 in the second drain line DL2 is de-energized to increase the pressure in the second line L2 and the spool of the 2-3 shift valve is moved leftward by the increased pressure in the second line L2. The line 107 is connected to the releasing side pressure chamber of the actuator 108 of the front brake 30. When a hydraulic pressure is introduced into the releasing side pressure chamber of the actuator 108, the actuator 108 moves the front brake 30 to the inoperative or releasing position. The pressure in the line 107 is further introduced into an actuator 109 of the front clutch 27 to cause the front clutch to engage.

The select valve 103 further has a port d which is communicated with the pressure line 101 when the select valve 103 is in the position 1. The port d is connected with the 1-2 shift valve 110 through a line 112 and with an actuator 114 of the rear brake 36 through a line 113. The 1-2 shift valve 110 and the 2-3 shift valve 120 respectively move their spools to change lines to operate the corresponding brakes and clutches when the solenoid valves SL1 and SL2 are de-energized by predetermined signals, thereby effecting the desired gear-shifting. The hydraulic control circuit CK is further provided with a cut-back valve 115 for stabilizing the hydraulic pressure from the pressure regulating valve 102, a vacuum throttle valve 116 for changing the line pressure from the pressure regulating valve 102 according to the intake negative pressure and a throttle back-up valve 117 for supplementing the vacuum throttle valve 116.

Further, the hydraulic control circuit CK is provided with the 3-4 shift valve 130 and an actuator 132 in order to control the clutch 54 and the brake 56 for the planetary gear type over-drive transmission mechanism 50. The actuator 132 has an engaging side pressure chamber connected to the pressure line 101 and the brake 56 is urged in the engaging position by the pressure in the line 101. When the solenoid valve SL3 is de-energized, the spool 131 of the 3-4 shift valve 130 is moved downward and the pressure line 101 is disconnected from a line 122 and the line 122 is drained. Thus, the hydraulic pressure applied to the releasing side pressure chamber of the actuator 132 of the brake 56 is removed, whereby the brake 56 is engaged and an actuator 134 releases the clutch 54.

The hydraulic control circuit CK is further provided with a lock-up control valve 133 which is communicated with the port a of the select valve 103 through a line L4. From the line L4 branches off a drain line DL4 provided with a solenoid valve SL4. When the solenoid valve SL4 is energized to close the drain line DL4 and the pressure in the line L4 is increased, the spool of the lock-up control valve 133 disconnects a line 123 from a line 124 and the line 124 is drained, thereby engaging the lock-up clutch 15.

The relationship between the transmission speeds and the operation of the solenoids, and the relationship between the transmission speeds and the operation of the clutches and brakes are shown in tables I to III.

TABLE I

| speeds | SL1 | SL2 | SL3 |
|---|---|---|---|
| 1 | ON | ON | ON |
| 2 | OFF | ON | ON |
| 3 | OFF | OFF | ON |
| 4 | OFF | OFF | OFF |

TABLE II

| SL4 | |
|---|---|
| ON | lock-up engage |
| OFF | release |

TABLE III

| | | CLUTCH 28 | CLUTCH 27 | CLUTCH 15 | CLUTCH 54 | BRAKE 36 | BRAKE 30 | BRAKE 56 | ONE-WAY CLUTCH 37 | GEAR RATIO |
|---|---|---|---|---|---|---|---|---|---|---|
| P | | | | | | o | | | | |
| R | | | o | | | o | o | | | 2.181 |
| N | | | | | | o | | | | |
| D | 1 | o | | | | o | | | o | 2.458 |
| | 2 | o | | (o) | | o | | o | | 1.458 |
| | 3 | o | o | (o) | | o | | | | 1.000 |
| | OD | o | o | (o) | | | | o | | 0.685 |
| 2 | | o | | | | o | | o | | 1.458 |
| 1 | 1 | o | | | | o | o | | | 2.458 |
| | 2 | o | | | | o | | o | | 1.458 |

Figure 3:
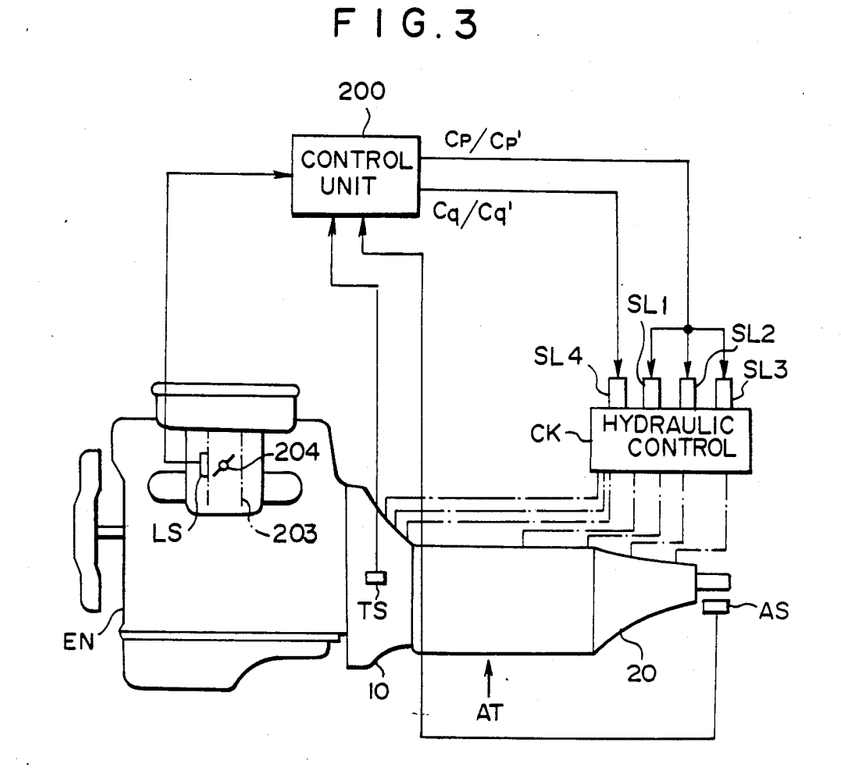

FIG. 3 is a schematic view showing an engine EN provided with the automatic transmission AT shown in FIG. 2 the hydraulic control circuit CK of which is controlled by an automatic transmission control system in accordance with an embodiment of the present invention.

In FIG. 3, into a control unit 200 are input signals from a turbine rpm sensor TS, a transmission output shaft rpm sensor AS and an engine load sensor LS for detecting the opening TH of the throttle valve 204 provided in an intake passage 203 of the engine EN. The signal from the transmission output shaft rpm sensor AS represents the vehicle speed V and the opening TH of the throttle valve 204 represents the engine load.

The control unit 200 controls the lockup, and at the same time, controls gear-shifting normally in accordance with main gear-shifting characteristics determined with the engine load (the opening TH of the throttle valve 204) and the turbine rpm Tsp employed as parameters, and in accordance with, in the case of failure of the turbine rpm sensor TS, backup gear-shifting characteristics are determined with only the vehicle speed V employed as a parameter. Accordingly, the control unit 200 has a built-in memory in which both the main gear-shifting characteristics and the backup gear-shifting characteristics are stored as gear-shifting maps.

Figure 4:
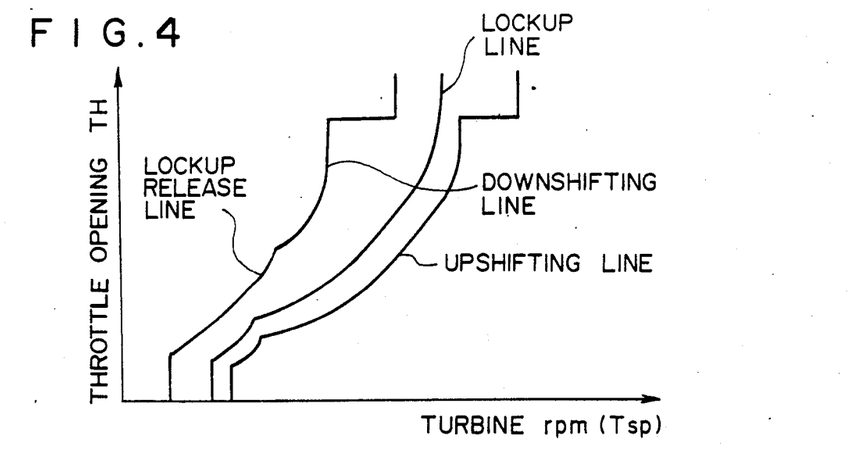
FIG. 4 is a graph illustrating an example of the main gear-shifting characteristics.

The control unit 200 determines whether gear-shifting is to be effected on the basis of the turbine rpm signal from the turbine rpm sensor TS, the throttle opening signal from the engine load sensor LS and running mode information from a running mode sensor (not shown), referring to an upshifting line and a downshifting line of the main gear-shifting map which is predetermined on the basis of the turbine rpm-engine load characteristics as shown in FIG. 4. Then the control unit 200 delivers an upshifting signal Cp or a downshifting signal Cp' depending on the result of the determination to said first to third solenoids SL1, SL2 and SL3 of the hydraulic control circuit CK to selectively energize the solenoids in the manner shown in FIG. 1, thereby causing the automatic transmission AT to upshift or downshift.

Figure 5:
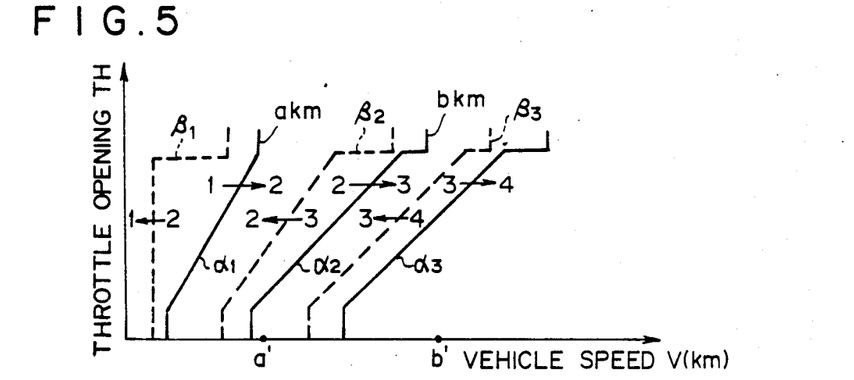
FIG. 5 is a graph illustrating the main gear-shifting characteristics shown in FIG. 4 using the vehicle speed as a parameter.

FIG. 5 shows gear-shifting lines obtained by changing the main gear-shifting map shown in FIG. 4 into the relation between the throttle opening TH and the vehicle speed V. That is, in FIG. 5, lines $a_1$ to $a_3$ are upshifting lines for upshifting from first to second, upshifting from second to third and upshifting from third to fourth, respectively. Lines $\beta_1$ to $\beta_3$ are downshifting lines for downshifting from second to first, downshifting from third to second and downshifting from fourth to third, respectively. Along the upshifting line $\beta_1$, the possible vehicle speed V is a Km at highest, and along the upshifting line $\beta_2$, the possible vehicle speed V is b Km at highest.

The control unit 200 determines whether lockup is to be effected or released on the basis of the turbine rpm signal from the turbine rpm sensor TS, the throttle opening signal from the engine load sensor LS and running mode information from a running mode sensor (not shown), referring to a lockup line and a lockup releasing line of the gear-shifting map which is predetermined on the basis of the turbine rpm-engine load characteristics as shown in FIG. 4. Then the control unit 200 delivers lockup signal Cq or a lockup releasing signal Cq' depending on the result of the determination to said fourth solenoid SL4 of the hydraulic control circuit CK.

Figure 6:
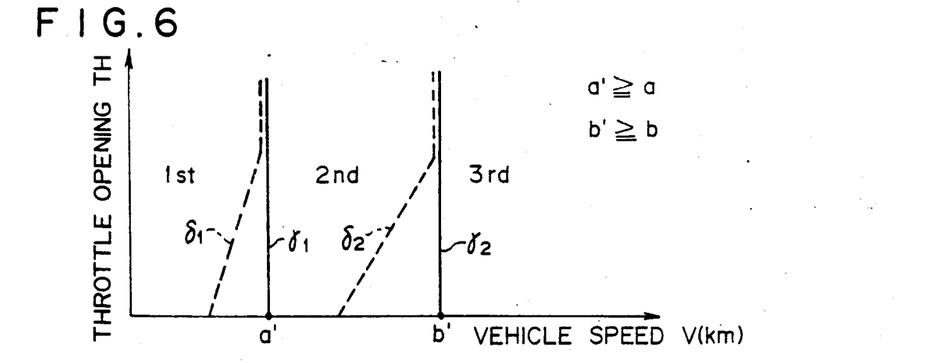
FIG. 6 is a graph illustrating an example of the backup gear-shifting characteristics.

In this particular embodiment, the backup gear-shifting map is determined with only the vehicle speed V employed as the parameter as shown by solid lines $\gamma_1$ and $\gamma_2$ in FIG. 6. That is, gear-shifting from first to second or from second to first is effected at a' Km irrespective of the throttle opening TH and gear-shifting from second to third or from third to second is effected at b' Km irrespective of the throttle opening TH. The gear-shifting map shown in FIG. 6 is arranged so that the upshifting and downshifting are effected at the same vehicle speed, i.e., a' Km or b' Km, in order to simplify the control. The vehicle speed V of a' Km at which the automatic transmission AT is caused to upshift from first to second or to downshift from second to first is set to be not lower than a Km which is the maximum speed at which the vehicle can travel in first gear. Similarly, the vehicle speed V of b' Km at which the automatic transmission AT is caused to upshift from second to third or to downshift from third to second is set to be not lower than b Km which is the maximum speed at which the vehicle can travel in second gear. The vehicle speeds of a' Km and b' Km should be obtained at an engine rpm not higher than a maximum permissible engine rpm, and the vehicle speeds of a' Km and b' Km correspond to the maximum permissible engine rpm.

The control unit 200 selects the higher one of the gear speeds determined in accordance with the main gear-shifting map and the backup gear-shifting map, and delivers the upshifting signal Cp or the downshifting signal Cp' so that the automatic transmission AT is shifted into the higher gear speed. The gear speed determined in accordance with the backup gear-shifting map can be higher than that determined in accordance with the main gear-shifting map when former gear speed is second (the latter gear speed being first) or third (the latter gear speed being first or second).

Figure 7:
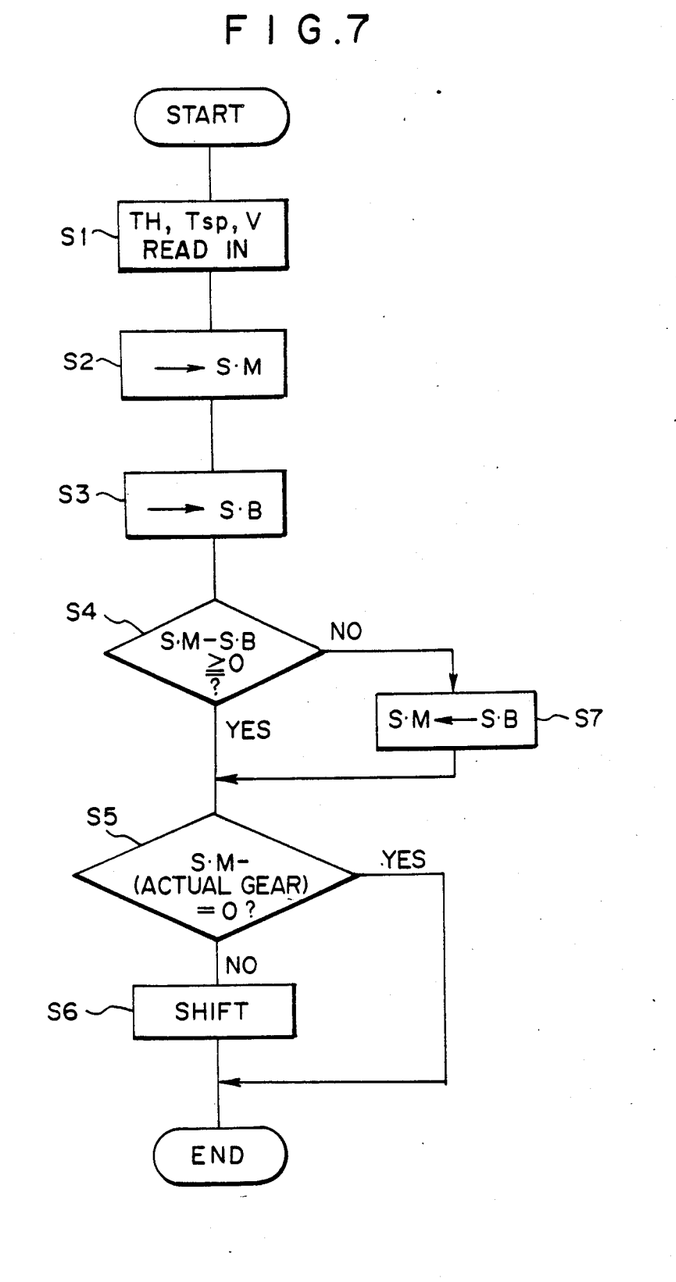
FIG. 7 is a flow chart for illustrating the operation of the control unit.

An example of the operation of the control unit 200 will be described hereinbelow with reference to the flow chart shown in FIG. 7.

In step S1, the throttle opening TH, the turbine rpm Tsp and the vehicle speed V are read in. Then in step S2, one of first to fourth is selected in accordance with the main gear-shifting map and then in step S3, one of first third is selected in accordance with the backup gear-shifting map. The gear speeds selected in accordance with the main gear-shifting map and the backup gear-shifting map will be respectively referred to as "main gear speed S.M" and "backup gear speed S.B", hereinbelow.

In step S4, the number of the backup gear speed S.B is subtracted from the number of the main gear speed S.M and it is determined whether the remainder is not smaller than zero. When the turbine rpm sensor TS is normal, the remainder should be not smaller than zero as can be understood from the relations between the vehicle speeds a and a' and between the vehicle speeds b and b' at which the gear-shifting is effected in accordance with the main gear-shifting map and the backup gear-shifting map. That is, the main gear speed S.M selected in accordance with the main gear-shifting map at a vehicle speed cannot be lower than the backup gear speed S.B selected in accordance with the backup gear-shifting map at the same speed. Accordingly, when it is determined that the remainder is not smaller than zero in the step S4, the control unit 200 proceeds to step S5 and calculates the difference between the selected main gear speed S.M and the actual gear speed. Then in step S6, the control unit 200 delivers the upshifting signal Cp or the downshifting signal Cp' to the solenoids SL1 to SL3 according to the difference therebetween. That is, when the difference is larger than zero, i.e., 1 or 2, the upshifting signal Cp is delivered to the solenoids and when the difference is smaller than 0, i.e., $-1$ or $-2$, the downshifting signal Cp' is delivered to the solenoids. On the other hand, when the difference is zero, the control is immediately ended since gear-shifting need not be effected.

When the turbine rpm sensor TS fails, the output Tsp of the turbine rpm sensor TS generally becomes zero, and accordingly, when the backup gear speed is second or third, the remainder calculated in the step S4 can be below zero. In this case, the main gear speed S.M is replaced by the backup gear speed S.B in step S7, and the control unit 200 proceeds to the step S5. That is, when the remainder is below zero, the gear-shifting control is effected in accordance with the backup gear-shifting map.

The lockup may be released when the gear-shifting control is effected in accordance with the backup gear-shifting map. In this case, a step for outputting the lockup releasing signal Cq' is added between the steps S4 and S7 or between the steps S7 and S5.

In the embodiment described above, the backup gear-shifting map is determined with only the vehicle speed employed as the parameter. However, the backup gear-shifting map may be determined with both the vehicle speed and the engine load employed as the parameter as shown by dotted lines $\delta_1$ and $\beta_2$ in FIG. 6. The latter is advantageous over the former in that the vehicle speed difference when the gear-shifting control is changed from the backup gear-shifting control to the main gear-shifting control. On the other hand, the former is advantageous over the latter in that the manufacturing cost may be reduced since the memory capacity may be relatively small. Further the former is advantageous over the latter in view of the simplicity of control and improvement in the response to control. The gear-shifting lines $\delta_1$ and $\beta_2$ are determined so that gear-shifting is effected in accordance with the backup gear-shifting map at vehicle speeds not lower than the vehicle speeds at which gear-shifting is effected in accordance with the main gear-shifting map.

If the control unit 200 is formed of a microcomputer, the microcomputer may be either of a digital type or an analogue type.

We claim:

1. A gear-shifting control system for an automatic transmission having a torque converter connected to an engine output shaft, a transmission gear mechanism connected to the output shaft of the torque converter, a fluid pressure type actuator means for actuating the transmission gear mechanism to shift, and an electromagnetic means for controlling the supply of pressurized fluid to the fluid pressure type actuator means, the gear-shifting control system comprising a rotational speed detecting means for detecting the rotational speed of the output shaft or the input shaft of the torque converter; an engine load detecting means for detecting engine load; a vehicle speed detecting means for detecting the vehicle speed; a main gear-shifting characteristic memory in which main gear-shifting characteristics are stored, gear-shifting points being determined with at least the engine load and the rotational speed of the output shaft or the input shaft of the torque converter employed as parameters in the main gear-shifting characteristics; a main gear-shifting determining means which receives at least the outputs of the rotational speed detecting means and the engine load detecting means and determines a main gear speed to be selected in accordance with the main gear-shifting characteristics; a backup gear-shifting characteristic memory in which backup gear-shifting characteristics are stored, gear-shifting points being determined with at least the vehicle speed employed as a parameter in the backup gear-shifting characteristics; a backup gear-shifting determining means which receives at least the output of the vehicle speed detecting means and determines a backup gear speed to be selected in accordance with the backup gear-shifting characteristics; a failure detecting means for detecting failure of the rotational speed detecting means; a gear speed signal switching means which receives the signals from the failure detecting means and the main and backup gear-shifting determining means and outputs the signal from the backup gear-shifting determining means when the rotational speed detecting means fails; and a transmission control means which controls the electromagnetic means according to the output of the gear speed signal switching means.

2. A gear-shifting control system as defined in claim 1 in which said backup gear-shifting characteristics is arranged with respect to the main gear-shifting characteristics so that each of the gear-shifting points in the backup gear-shifting characteristics occurs at a vehicle speed which is not lower than the vehicle speed at which the gear-shifting point in the main gear-shifting characteristics corresponding to the gear-shifting point in the backup gear-shifting characteristics occurs.

3. A gear-shifting control system as defined in claim 2 in which said failure detecting means detects failure of the rotational speed detecting means through comparison of the gear speed selected in accordance with the main gear-shifting characteristics and the same selected in accordance with the backup gear-shifting characteristics, and said gear speed signal switching means outputs the signal representing the higher of the gear speeds selected in accordance with the main gear-shifting characteristics and the backup gear-shifting characteristics.

4. A gear-shifting control system as defined in claim 2 in which the upshifting points in the backup gear-shifting characteristics are determined to occur at engine speeds not higher than the maximum permissible engine speed.

5. A gear-shifting control system as defined in claim 2 in which, in accordance with the backup gear-shifting characteristics, each of the upshifting points coincides with the corresponding downshifting point.

6. A gear-shifting control system as defined in claim 2 in which said backup gear-shifting characteristics are determined with both the vehicle speed and the engine load employed as the parameters, and said backup gear-shifting determining means receives signals from the vehicle speed detecting means and the engine load detecting means to determine the backup gear speed to be selected in accordance with the backup gear-shifting characteristics.

7. A gear-shifting control system as defined in claim 2 in which said main gear-shifting characteristics provide four gear speeds and said backup gear-shifting characteristics provide three gear speeds.

8. A gear-shifting control system as defined in claim 1 in which said automatic transmission further comprises a lockup mechanism for locking together the input shaft and the output shaft of the torque converter, and the lockup of the lockup mechanism is released when the rotational speed detecting means fails.

9. A gear-shifting control system for an automatic transmission having a torque converter connected to an engine output shaft, a transmission gear mechanism connected to the output shaft of the torque converter, a fluid pressure type actuator means for actuating the transmission gear mechanism to shift, and an electromagnetic means for controlling supply of pressurized fluid to the fluid pressure type actuator means, the gear-shifting control system comprising a rotational speed detecting means for detecting the rotational speed of the output shaft of the torque converter; an engine load detecting means for detecting load on the engine; a vehicle speed detecting means for detecting the vehicle speed; a main gear-shifting characteristic memory in which main gear-shifting characteristics are stored, gear-shifting points being determined with the engine load and the rotational speed of the output shaft of the torque converter employed as parameters in the main gear-shifting characteristics; a main gear-shifting determining means which receives the outputs of the rotational speed detecting means and the engine load detecting means and determines a main gear speed to be selected in accordance with the main gear-shifting characteristics; a backup gear-shifting characteristic memory in which backup gear-shifting characteristics are stored, gear-shifting points being determined with at least the vehicle speed employed as a parameter in the backup gear-shifting characteristics; a backup gear-shifting determining means which receives at least the output of the vehicle speed detecting means and determines a backup gear speed to be selected in accordance with the backup gear-shifting characteristics; a failure detecting means for detecting failure of the rotational speed detecting means; a gear speed signal switching means which receives the signals from the failure detecting means and the main and backup gear-shifting determining means and outputs the signal from the backup gear-shifting determining means when the rotational speed detecting means fails; and a transmission control means which controls the electromagnetic means according to the output of the gear speed signal switching means.

10. A gear-shifting control system as defined in claim 9 in which, in said backup gear-shifting characteristics, gear-shifting points are determined with only the vehicle speed employed as the parameter and said backup gear-shifting determining means receives the output of the vehicle speed detecting means and determines a backup gear speed to be selected in accordance with the backup gear-shifting characteristics.

11. A gear-shifting control system as defined in claim 10 in which said backup gear-shifting characteristics are arranged with respect to the main gear-shifting characteristics so that each of the gear-shifting points in the backup gear-shifting characteristics occurs at a vehicle speed which is not lower than the vehicle speed at which the gear-shifting point in the main gear-shifting characteristics corresponding to the gear-shifting point in the backup gear-shifting characteristics occurs.

* * * * *